US006984416B2

(12) United States Patent
Farkas et al.

(10) Patent No.: US 6,984,416 B2
(45) Date of Patent: Jan. 10, 2006

(54) ARCHIVAL SPRAY COMPOSITION

(75) Inventors: Barbara J. Farkas, Willoughby Hills, OH (US); James J. Johnson, Cuyahoga Falls, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 23 days.

(21) Appl. No.: 11/068,361

(22) Filed: Feb. 28, 2005

(65) Prior Publication Data

US 2005/0139809 A1 Jun. 30, 2005

Related U.S. Application Data

(63) Continuation of application No. 10/764,352, filed on Jan. 23, 2004, now Pat. No. 6,890,455.

(60) Provisional application No. 60/442,793, filed on Jan. 25, 2003.

(51) Int. Cl.
*C23C 26/00* (2006.01)
*C09K 15/18* (2006.01)
*C09K 15/32* (2006.01)

(52) U.S. Cl. .......................... 427/255.24; 427/255.14; 252/400.1; 252/400.31; 252/400.52; 252/400.61; 252/401; 162/160; 106/285; 106/287.1; 106/287.19; 106/287.26; 106/287.28

(58) Field of Classification Search .......... 427/255.14, 427/255.24; 252/400.1, 400.31, 400.52, 252/400.61, 401; 162/160; 106/285, 287.1, 106/287.19, 287.26, 287.28
See application file for complete search history.

(56) References Cited

U.S. PATENT DOCUMENTS

| 3,703,353 | A | * | 11/1972 | Kusterer et al. ...... 427/255.394 |
| 3,771,958 | A | * | 11/1973 | Kusterer et al. ......... 427/248.1 |
| 4,619,735 | A | * | 10/1986 | Norton ....................... 162/135 |
| 5,468,705 | A | * | 11/1995 | Rauleder et al. ............ 502/151 |
| 6,890,455 | B2 | * | 5/2005 | Farkas et al. ............... 252/401 |

* cited by examiner

*Primary Examiner*—David Brunsman
(74) *Attorney, Agent, or Firm*—Arthi K. Tirey; Robert E. McDonald; Paul R. Katterle

(57) ABSTRACT

A method of preserving cellulosic material that includes the application of an archival composition on the substrate. The aerosol archival product includes an aerosol archival composition and may be disposed in a pressurized container. The aerosol archival composition includes one or more chlorinated fluorinated hydrocarbons, an amino-containing compound and a basic metal compound. The aerosol archival composition may also contain an adhesion promoter.

19 Claims, 1 Drawing Sheet

ARCHIVAL SPRAY COMPOSITION

CROSS-REFERENCE TO RELATED APPLICATION

This application is a continuation of U.S. patent application Ser. No. 10/764,352, filed on Jan. 23, 2004 now U.S. Pat. No. 6,890,455, which claims the benefit of U.S. Provisional Application No. 60/442,793, filed Jan. 25, 2003, which are both herein incorporated by reference.

BACKGROUND OF THE INVENTION

The present invention relates to the preservation of cellulosic materials, and more particularly, to an aerosol archival composition for preserving cellulose-based materials.

The deterioration of paper, books, manuscripts and newspaper clippings is well-known to librarians, archivists and scrap book enthusiasts throughout the world. The causes of paper deterioration are numerous and include inherent acidity, photodegradation, oxidation, and even microbiological attack under certain conditions. These factors combined with poor initial paper quality have severely reduced the permanence of cellulosic materials held by libraries, archival collections and scrap book enthusiasts.

Archival compositions for preserving cellulosic materials are known. Examples of such compositions are disclosed in U.S. Pat. Nos. 3,676,182; 4,522,843; 5,409,736; 6,080,448; and 6,342,098, which are hereby incorporated by reference. Most of the foregoing archival compositions are not adapted for aerosol application and/or have disadvantages, such as including CFC's. The archival composition of the present invention is adapted for aerosol application and addresses some of the disadvantages of the foregoing archival compositions.

SUMMARY OF THE INVENTION

The present invention relates to the preservation of cellulosic materials, and more particularly, to an aerosol archival product for preserving cellulose-based materials. The product includes an aerosol archival composition and the container into which the aerosol archival composition is deposited. The container includes a can, a valve cup, and valve assembly. The container also includes a dip tube and an actuator.

An aerosol archival composition is deposited into the can. In one embodiment of the present invention, the aerosol archival composition includes at least one halogenated hydrocarbon, an amino-containing compound, a basic metal compound, and a propellant. The propellant that is used in this embodiment is a blend of n-butane and propane. The amino-containing compound is an alcohol that contains an amino group. The basic metal compound suitable for use in accordance with this embodiment is a carbonate, such as calcium carbonate, magnesium carbonate or zinc carbonate. An adhesion promoter, or binder, may also be used in an alternative embodiment in order to assist in the adhesion of the basic metal compound to the cellulosic material.

BRIEF DESCRIPTION OF THE DRAWING

The features, aspects, and advantages of the present invention will become better understood with regard to the following description, appended claims, and accompanying drawing where:

DETAILED DESCRIPTION OF THE PREFERRED EMBODIMENTS

Figure 1:
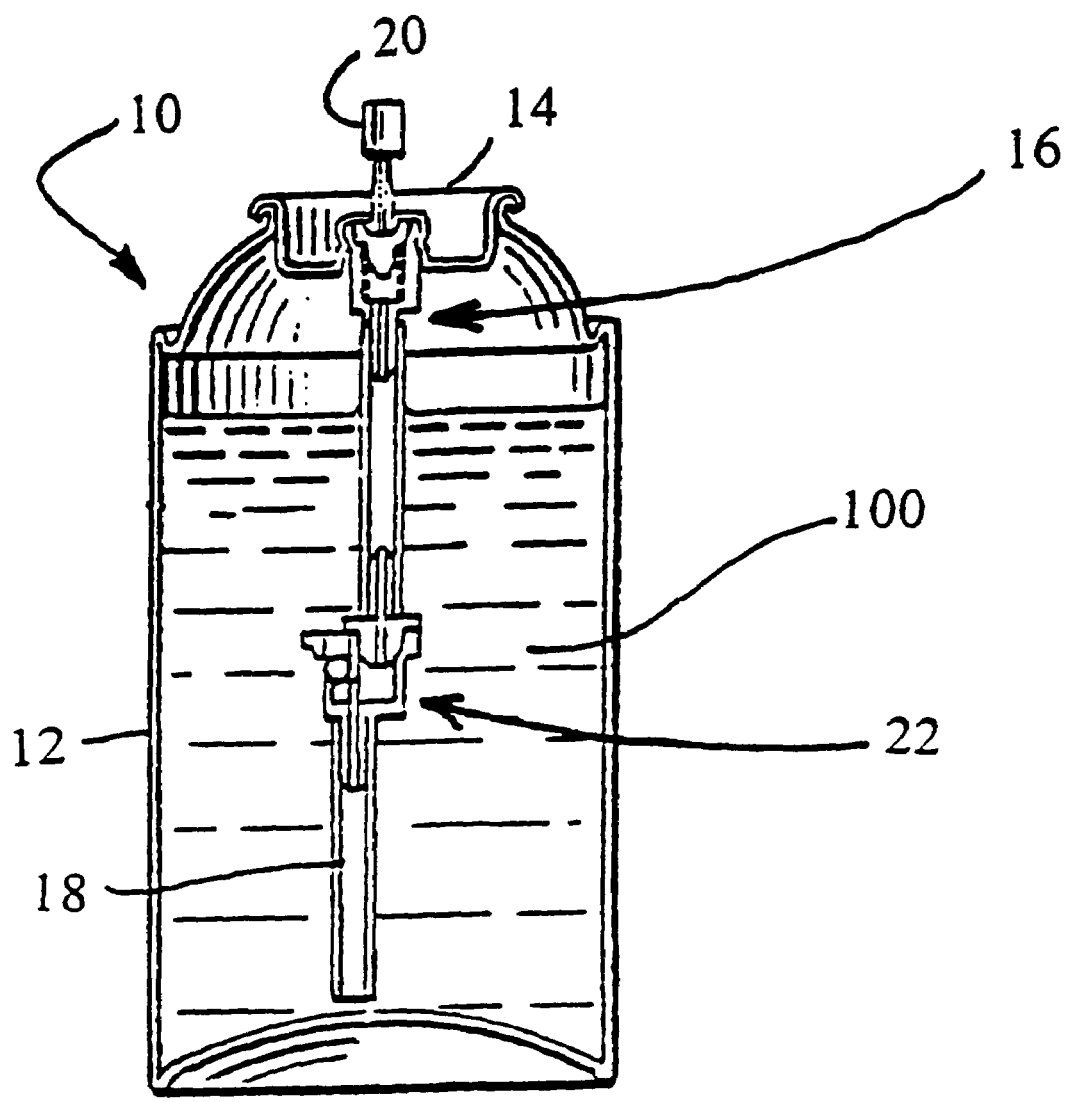
FIG. 1 shows a schematic view of an aerosol container charged with an aerosol archival composition embodied in accordance with the present invention.

The aerosol archival composition of the present invention generally comprises a solvent-borne archival composition and a propellant. The aerosol archival composition is substantially free of water.

The solvent-borne archival composition generally comprises a solvent system, an amino-containing compound and a basic metal compound.

The solvent system is non-aqueous, harmless to cellulosic material and does not dissolve dyes, inks or adhesive components of cellulosic materials. Preferably, the solvent system comprises one or more halogenated hydrocarbon solvents. More preferably, the solvent system comprise one or more chlorinated fluorinated hydrocarbons, such as 3,3-dichloro-1,1,1,2,2-pentafluoropropane (225 ca), 1,3-dichloro-1,1,2,2,3-pentafluoropropane (225cb), and 1,1-dichloro-1-fluoroethane (141b)), and the like. In one embodiment, the solvent system comprises a blend of 3,3-dichloro-1,1,1,2,2-pentafluoropropane (225 ca), 1,3-dichloro-1,2,2,3-pentafluoropropane (225cb), which is sold by Asahi Glass Company, Ltd. under the trade names Asahiklin AK-225 and Asahiklin AK-225A.

In one embodiment, the amount of the solvent system present in the aerosol archival composition is at least 30 weight percent of the total weight of the aerosol archival composition. Preferably, the amount of the solvent system present in the aerosol archival composition is from about 40 to about 60 weight percent, more preferably from about 50 to about 60 weight percent of the total weight of the aerosol archival composition.

The amino-containing compound is preferably an alcohol having a primary, secondary or tertiary amino group, such as monoethanolamine, diethanolamine, and N,N-dimethylethanolamine. More preferably, the amino-containing compound comprises N,N-dimethylethanolamine.

In one embodiment of the present invention, the amount of the amino-containing compound present in the aerosol archival composition is at least 0.04 weight percent of the total weight of the aerosol archival composition. Preferably, the amount of the amino-containing compound present in the aerosol archival composition is from about 0.05 to about 1.0 weight percent, more preferably about 0.60 weight percent of the aerosol archival composition.

The basic metal compound may be an oxide, hydroxide, carbonate or bicarbonate of zinc or a Group 1 or Group 2 metal of the Periodic table. Preferably, the basic metal compound has a cation that is magnesium, zinc, sodium, potassium, or calcium. Particularly preferred are the oxides, carbonates and bicarbonates of magnesium, zinc and calcium, and the hydroxides of sodium, potassium and calcium. Representative examples include calcium carbonate, calcium hydroxide, magnesium oxide, magnesium carbonate, magnesium bicarbonate, zinc carbonate, zinc bicarbonate, zinc oxide, sodium hydroxide, and potassium hydroxide. Preferably, the basic metal compound is calcium carbonate.

The amount of the basic metal compound present in one embodiment of the aerosol archival composition is at least 0.04 weight percent of the total weight of the aerosol archival composition. Preferably, the amount of the basic metal compound present in the aerosol archival composition is from about 0.05 to about 1.00 weight percent of the aerosol archival composition.

Applicants have found that the combination of N,N-dimethylethanolamine and calcium carbonate work together synergistically to provide unexpectedly good results in preserving cellulosic materials. Preferably, the ratio of N,N-dimethylethanolamine to calcium carbonate is in a range from about 1:2 to about 2:1, more preferably in a range from about 1:1 to about 1.5:1. Still more preferably, the ratio of N,N-dimethylethanolamine to calcium carbonate is about 1.2:1.

An adhesion promoter, or binder, may also be added to the composition in order to increase the adhesion of basic metal compound onto the cellulosic substrate. Any suitable adhesion promoter may be utilized. Adhesion promoters appear to be desirable for their contribution to maintaining the efficacy of the aerosol archival composition, particularly for their contribution in maintaining a larger concentration of alkaline material after application of the composition to the cellulosic material. Moreover, in alternative embodiments, a combination of adhesion promoters may be utilized. Examples of adhesion promoters include organosilanes and organotitanates. Examples of organosilanes include trichlorosilane, vinyltrichlorosilane, methyltrichlorosilane, methyldichlorosilane, dimethyldichlorosilane, methylvinyl dichlorosilane, hexamethyldisilizane, methyltriethoxysilane, methyltrimethoxysilane, vinyltriethoxysilane, vinyltrimethoxysilane, vinyl-tris(2-methoxyethoxysilane), vinyltriacetoxysilane, gamma-methacryloxypropyltrimethoxysilane, gamma-methacryloxypropyl-tris-(2-methoxyethoxy)silane, beta-(3,4-epoxycyclohexyl)ethyltrimethoxysilane, and gamma-glycidoxypropyltrimethoxysilane.

Examples of organotitanates include transition metal organates such as titanium organates, zirconium organates, hafnium organates, and the like. Commercially available organates include the titanium organates that are sold by DuPont Chemical Co. under the tradename TYZOR® titanates. Examples of TYZOR® titanates include TYZOR® TBT, which is titanium tetra-n-butoxide, TYZOR® TPT, which is titanium triisopropoxide, TYZOR® GBA, which is titanium diisopropoxide bis(2,4-pentanedionate), TYZOR® LA, which is titanium ammoniumlactate, and TYZOR® AA, which is titanium acetylacetonate. TYZOR® TBT is the preferred titanate that may be used in accordance with this invention.

It is also believed that other types of adhesion promoters may be used in accordance with this invention to produce favorable binding results. Such other adhesion promoters include, but are not limited to polyolefins, chloropolyolefins, phosphates, phenolic compounds, and methacrylates.

In one embodiment of the present invention, the amount of adhesion promoter present in the aerosol archival composition is less than 1.0 weight percent of the total weight of the aerosol archival composition. Preferably, the amount of the adhesion promoter is 0.01 to about 0.50 weight percent, more preferably about 0.10 weight percent of the aerosol archival composition.

The aerosol archival composition of the present invention is formed by combining the solvent-borne archival composition (as described above) with the propellant.

The propellant is a liquifiable gas having a vapor pressure sufficient to propel the aerosol archival composition from the container. Preferably, the propellant is selected from the group consisting of ethers, such as dimethyl ether (DME) and diethyl ether; C1–C4 saturated hydrocarbons, such as methane, ethane, propane, n-butane, and isobutane; hydrofluorocarbons (HFC), such as 1,1,1,2-tetrafluoroethane (HFC-134a), 1,1,1,2,3,3,3, -heptafluoropropane (HFC-227HFC), difluoromethane (HFC-32), 1,1,1-trifluoroethane (HFC-143a), 1,1,2,2-tetrafluoroethane (HFC-134), and 1,1-difluoroethane (HFC-152a); and mixtures of the foregoing. More preferably, the propellant is a blend of n-butane and propane. The amount of the propellant present in the aerosol archival composition is preferably from about 20 to about 60 weight percent, more preferably from about 30 to about 50 weight percent of the total weight of the aerosol archival composition.

The components of the solvent-borne archival composition are blended together at a temperature preferably less than 70° F. The resulting solvent-borne archival composition is added to a container, such as a container 10 shown in FIG. 1. The propellant is then added to the container 10 to form the aerosol archival composition.

Referring now to FIG. 1, the container 10 comprises a body 12, to which a valve cup 14 is secured. A valve assembly 16 with a dip tube 18 connected thereto is secured to the valve cup 14. The dip tube 18 extends into the interior of the body 12 and is in contact with the aerosol archival composition, which is designated by the numeral 100. The body 12 may be composed of aluminum or tin plated steel. The valve cup 14 may be sealed to the can 12 and the propellant charged through the valve assembly 16, or the body 12 may be charged with the propellant under the valve cup 14, and then the valve cup 14 sealed to the body 12. An actuator 20 is then connected to the valve assembly 16.

Various valves, dip tubes and actuators may be used to spray the aerosol archival composition. Preferably, the dip tube 18 has a diameter of about 0.147 inches. The valve assembly 16 may be either a "female" aerosol valve or a "male" aerosol valve. Examples of "female" aerosol valves that may be used in the present invention are disclosed in U.S. Pat. Nos. 3,033,473; 3,061,203; 3,074,601; 3,209,960; and 5,027,985. Examples of "male" aerosol valves that may be used in the present invention are disclosed in U.S. Pat. Nos. 2,631,814, and 4,572,406. A particularly useful valve assembly 16 is a "female" valve with a spray controller 22 having a construction as disclosed in U.S. Pat. No. 4,572,406, which is hereby incorporated by reference. The spray controller 22 permits the aerosol archival composition 100 to be dispensed when the container 10 is inverted.

The aerosol archival composition of the present invention may be applied to a variety of different cellulosic materials, such as newspapers, books and manuscripts, and finds particular utility in preserving cellulosic materials for addition to scrap books. The aerosol archival composition may be applied, for example, by spraying the entire surface area of cellulosic material, such as using an even, sweeping motion.

The invention may be better understood by reference to the following example:

EXAMPLE 1

A batch of the inventive solvent-borne archival composition was formed in a mixing vessel. The batch was formed from the following components in the noted amounts, where parts are parts by weight.

| | |
|---|---|
| (a.) AK-225 A* | 55.00 parts |
| (b.) N,N-dimethylethanolamine | 0.06 parts |
| (c.) calcium carbonate | 0.05 parts |
| Total | 55.11 parts |

*AK-225 A is a blend of about 91–98 weight percent of 3,3-dichloro-1,1,1,2,2-pentafluoropropane (225 ca) and about 2–9 weight percent of 1,3-dichloro-1,1,2,2,3-pentafluoropropane (225 cb), which blend is available from Asahi Glass Company, Ltd.

The entire batch of the solvent-borne archival composition was then charged to an aerosol container composed of tin-plated steel and pressurized with 55.00 parts by weight of a blend of n-butane and propane to thereby yield a batch of an aerosol archival composition.

EXAMPLE 2

In this example, a batch of the inventive solvent-borne archival composition was also formed in a mixing vessel. The batch was formed from the following components in the noted amounts, where parts are parts by weight.

| | |
|---|---|
| (a.) AK-225 A* | 44.89 parts |
| (b.) N,N-dimethylethanolamine | 0.06 parts |
| (c.) calcium carbonate | 0.05 parts |
| Total | 45.00 parts |

*AK-225 A is a blend of about 91–98 weight percent of 3,3-dichloro-1,1,1,2,2-pentafluoropropane (225 ca) and about 2–9 weight percent of 1,3-dichloro-1,1,2,2,3-pentafluoropropane (225 cb), which blend is available from Asahi Glass Company, Ltd.

All of the batch of the solvent-borne archival composition was then charged to an aerosol container composed of tin-plated steel and pressurized with 55.00 parts by weight of a blend of n-butane and propane to thereby yield a batch of an aerosol archival composition.

EXAMPLE 3

In this example, a batch of the inventive solvent-borne archival composition was again formed in a mixing vessel. The batch was formed from the following components in the noted amounts, where parts are parts by weight.

| | |
|---|---|
| (a.) AK-225 A* | 43.90 parts |
| (b.) N,N-dimethylethanolamine | 0.60 parts |
| (c.) calcium carbonate | 0.50 parts |
| Total | 45.00 parts |

*AK-225 A is a blend of about 91–98 weight percent of 3,3-dichloro-1,1,1,2,2-pentafluoropropane (225 Ca) and about 2–9 weight percent of 1,3-dichloro-1,1,2,2,3-pentafluoropropane (225 cb), which blend is available from Asahi Glass Company, Ltd.

All of the batch of the solvent-borne archival composition was then charged to an aerosol container composed of tin-plated steel and pressurized with 55.00 parts by weight of a blend of n-butane and propane to thereby yield a batch of an aerosol archival composition.

EXAMPLE 4

In this example, a batch of the inventive solvent-borne archival composition was formed in a mixing vessel. The batch was formed from the following components in the noted amounts, where parts are parts by weight.

| | |
|---|---|
| (a.) AK-225 A* | 43.30 parts |
| (b.) N,N-dimethylethanolamine | 0.60 parts |
| (c.) calcium carbonate | 1.00 parts |
| (d.) Tyzor ® TBT | 0.10 parts |
| Total | 45.90 parts |

*AK-225 A is a blend of about 91–98 weight percent of 3,3-dichloro-1,1,1,2,2-pentafluoropropane (225 ca) and about 2–9 weight percent of 1,3-dichloro-1,1,2,2,3-pentafluoropropane (225 cb), which blend is available from Asahi Glass Company, Ltd.

The entire batch of the solvent-borne archival composition was then charged to an aerosol container composed of tin-plated steel and pressurized with 55.00 parts by weight of a blend of n-butane and propane to thereby yield a batch of an aerosol archival composition.

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

What is claimed is:

1. A method of preserving cellulosic material comprising applying an aerosol archival composition disposed within a container to said material, said aerosol archival composition comprising:
    at least 30 weight percent of one or more chlorinated fluorinated hydrocarbons;
    at least 0.04 weight percent of an amino-containing compound;
    at least 0.04 weight percent of a basic metal compound; and
    a propellant selected from the group consisting of ethers, C1–C4 saturated hydrocarbons, hydrofluorocarbons, and mixtures of the foregoing.

2. The method of claim 1, wherein said container comprises a can, a valve cup with a valve assembly, a dip tube and an actuator.

3. The method of claim 1, wherein the propellant is a blend of n-butane and propane.

4. The method of claim 1, wherein the amino-containing compound is an alcohol having an amino group.

5. The method of claim 4, wherein the basic metal compound is a carbonate of a metal selected from the group consisting of calcium, magnesium and zinc.

6. The method of claim 1, wherein said aerosol archival composition further comprises an adhesion promoter.

7. The method of claim 6, wherein said aerosol archival composition comprises less than 1.0 weight percent of the adhesion promoter.

8. The method of claim 6, wherein said adhesion promoter is an organosilane.

9. The method of claim 6, wherein said adhesion promoter is an organotitanate.

10. The method of claim 9, wherein said organotitanate is tetra-n-butoxide.

11. A method of preserving cellulosic material comprising applying an archival composition to said material, said archival composition comprising
- about 40 to about 60 weight percent of one or more chlorinated fluorinated hydrocarbons;
- about 0.05 to about 1.0 weight percent of an amino-containing compound;
- about 0.05 to about 1.00 weight percent of a basic metal compound;
- about 0.01 to about 0.5 weight percent of a binder; and
- a propellant; and wherein said archival composition is disposed within a container.

12. The method of claim 11, wherein said container comprises a can, a valve cup with a valve assembly, a dip tube and an actuator.

13. The method of claim 11, wherein said propellant is selected from the group consisting of ethers, C1–C4 saturated hydrocarbons, hydrofluorocarbons, and mixtures of the foregoing.

14. The method of claim 11, wherein the amount of propellant is from 20 to about 60 weight percent of the total weight of the aerosol archival composition.

15. The method of claim 11, wherein said binder is an organotitanate.

16. The method of claim 11, wherein said binder is an organosilane.

17. A method of preserving cellulosic material comprising applying an archival composition to the cellulosic material, said archival composition comprising:
- at least 30 weight percent of one or more chlorinated fluorinated hydrocarbons;
- at least 0.04 weight percent of an amino-containing compound;
- at least 0.04 weight percent of a basic metal compound;
- an adhesion promoter; and
- a propellant.

18. The method of claim 17, wherein said archival composition is disposed within a container.

19. The method of claim 18, wherein said container comprises a can, a valve cup with a valve assembly, a dip tube and an actuator.

* * * * *